United States Patent [19]

Tokuyama

[11] Patent Number: 4,680,649
[45] Date of Patent: Jul. 14, 1987

[54] BACK-SPACE EDITING CONTROL CIRCUIT FOR ROTARY-HEAD MAGNETIC TAPE RECORDING AND REPRODUCING APPARATUS

[75] Inventor: Yoshio Tokuyama, Yokohama, Japan

[73] Assignee: Victor Company of Japan, Ltd., Yokohama, Japan

[21] Appl. No.: 818,180

[22] Filed: Jan. 10, 1986

[30] Foreign Application Priority Data

Jan. 12, 1985 [JP] Japan .................................. 60-3740

[51] Int. Cl.$^4$ ........................ G11B 27/02; H04N 5/91
[52] U.S. Cl. ..................................... 360/14.2; 360/69; 358/335
[58] Field of Search ....................... 360/13, 14.1, 14.2, 360/18, 69; 358/335, 337, 338

[56] References Cited

U.S. PATENT DOCUMENTS

4,510,535 4/1985 Tokumitsu ........................ 360/13 X
4,554,602 11/1985 Tobe .................................. 360/13 X Primary Examiner—Aristotelis M. Psitos
Attorney, Agent, or Firm—Michael N. Meller

[57] ABSTRACT

A back-space editing control circuit comprises a sampling signal producing circuit for producing a sampling signal from a control signal reproduced from a magnetic tape in an assembly state and for producing a sampling signal from a capstan motor rotation detection signal in a recording state, a trapezoidal wave signal producing circuit for producing a trapezoidal wave signal from a signal based on a synchronizing signal in the assembly state and for producing a trapezoidal wave signal from the rotation detection signal in the recording state, and a driving and control circuit for sampling the trapezoidal wave signal from the trapezoidal wave signal producing circuit by the sampling signal from the sampling signal producing circuit and for driving and controlling a rotational phase of a capstan motor by use of a sampled signal.

8 Claims, 54 Drawing Figures

FIG. 7 the present invention is to
BACK-SPACE EDITING CONTROL CIRCUIT FOR ROTARY-HEAD MAGNETIC TAPE RECORDING AND REPRODUCING APPARATUS

BACKGROUND OF THE INVENTION

The present invention generally relates to back-space editing control circuits, and more particularly to a back-space editing control circuit which carries out a control so that a rotational phase of a capstan motor is not disturbed when an operation mode of an information signal recording and reproducing apparatus is switched from a recording pause mode to a recording mode so as to perform a back-space editing.

Generally, in addition to normal recording and reproduction, various kinds of editing are performed in a video signal recording and reproducing apparatus (hereinafter simply referred to as a video tape recorder or VTR). For example, there is the so-called back-space editing for cutting unwanted parts of a television program such as commercials. When performing the back-space editing, the VTR is put into a recording pause mode during the commercials and the VTR is put back into a recording ode when the commercials are over, so that the commercials are not recorded on a magnetic tape. However, when the recording pause mode is cancelled and the VTR is put back into the recording mode to resume the recording, a discontinuity occurs between video tracks formed on the tape up to a time when the VTR is put into the recording pause mode and video tracks formed on the tape from a time when the recording is resumed. Similarly, a discontinuity occurs between a control signal recorded on the tape up to the time when the VTR is put into the recording pause mode and a control signal recorded on the tape from a time when the recording is resumed. For this reason, distortions occur in a reproduced picture and reproduced sound when such a discontinuous part on the tape is reproduced.

In order to prevent such a discontinuous part from being formed on the tape, a conventional VTR rewinds the tape by a distance corresponding to approximately thirty control pulses of the control signal recorded on the tape when the VTR is put into the recording pause mode. When the recording pause mode is cancelled and the VTR is put back into the recording mode to resume the recording, a capstan motor is controlled while the tape moves a distance corresponding to approximately twenty-five control pulses of the control signal recorded on the tape so that a regular tape moving speed is reached and video heads accurately scan over the previously recorded video tracks on the tape. The recording of the video and audio signals and the control signal is started from a time when the regular tape moving speed is reached. As a result, the video and audio signals and the control signal are recorded over the previously recorded signals on the tape for several frames of the video signal, but the previously recorded signals are only erased to such an extent that no problems are introduced from the practical point of view.

From the time when the recording pause mode is cancelled up to a time when the VTR actually assumes a stable recording state, the VTR is in the so-called assembly state. In the assemblys tate, the capstan motor is controlled so that the tape moving speed reaches the regular tape moving speed and the video heads accurately scan over the previously recorded video tracks on the tape. In the assembly state of the conventional VTR, a sampling pulse signal is obtained from the control signal reproduced from the tape or from a frequency divider reset by the reproduced control signal for frequency-dividing a capstan rotation detection pulse signal which is obtained by detecting the rotation of the capstan motor, and a sampled signal (phase error signal) is obtained by sampling a trapezoidal wave signal which is obtained from a vertical synchronizing signal of the video signal by the sampling pulse signal. The phase error signal is used to control a rotational phase of the capstan motor so that the video heads accurately scan over the previously recorded video tracks on the tape. When the assembly state is ended and the recording state is reached, a sampled signal (phase error signal) is obtained by sampling the trapezoidal wave signal by the sampling pulse signal which is obtained by frequency-dividing the capstan rotation detection pulse signal, and the rotational phase of the capstan motor is controlled by use of the phase error signal.

However, as will be described later on in the present specification in conjunction with drawings, a timing of the sampling pulse signal does not coincide with a timing of an ideal sampling pulse signal in the case where the tape moving speed is relatively small. In this case, there is a problem in that the rotational phase of the capstan motor becomes disturbed when the mode of the VTR is switched from the recording pause mode to the recording mode.

SUMMARY OF THE INVENTION

Accordingly, it is a general object of the present invention to provide a novel and useful back-space editing control circuit in which the problems described heretofore are eliminated.

Another and more specific object of the present invention is to provide a back-space editing control circuit which carries out a control so that a rotational phase of a capstan motor is not disturbed when an operation mode of an information signal recording and reproducing apparatus is switched from a recording pause mode to a recording mode so as to perform a back-space editing.

Still another object of the present invention is to provide a back-space editing control circuit comprising sampling signal producing means for producing a sampling signal from a reproduced control signal in an assembly state and for producing a sampling signal from a capstan motor rotaion detection signal in a recording state, trapezoidal wave signal producing means for producing a trapezoidal wave signal from a signal based on a synchronizing signal in the assembly state and for producing a trapezoidal wave signal from the rotation detection signal in the recording state, and driving and control means for sampling the trapezoidal wave signal from the trapezoidal wave signal producing means by the sampling signal from the sampling signal producing means and for driving and controlling a rotational phase of a capstan motor by use of a sampled signal. According to the circuit of the present invention, a sloping part of a waveform of the trapezoidal wave signal is always sampled by the sampling signal. As a result, the rotational phase of the capstan motor will not be disturbed even when the state changes from the assembly state to the recording state, and it is thus possible to prevent distortions from being generated in a reproduced picture and reproduced sound.

DETAILED DESCRIPTION

Figure 1:
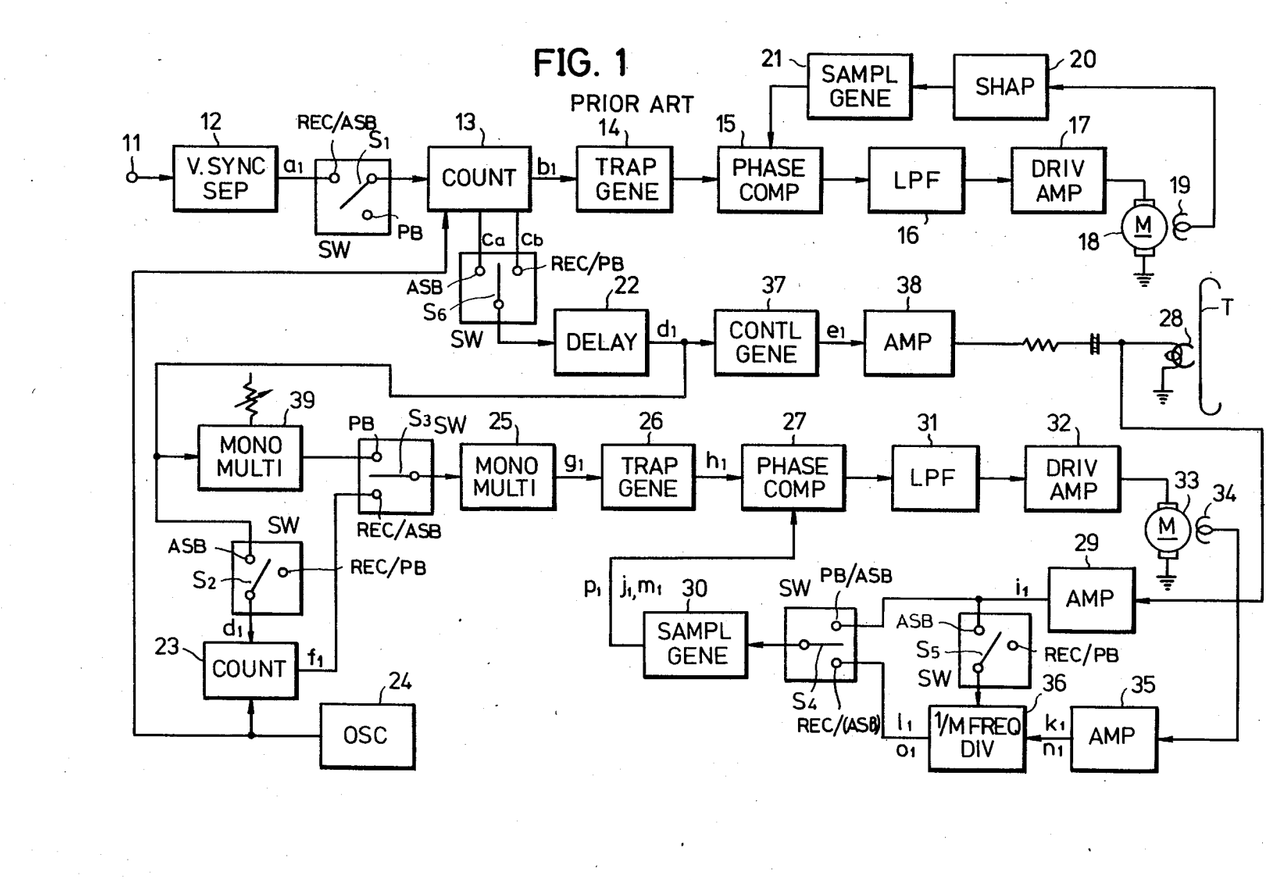
FIG. 1 is a system block diagram showing an example of a conventional back-space editing control circuit.
Figure 2:
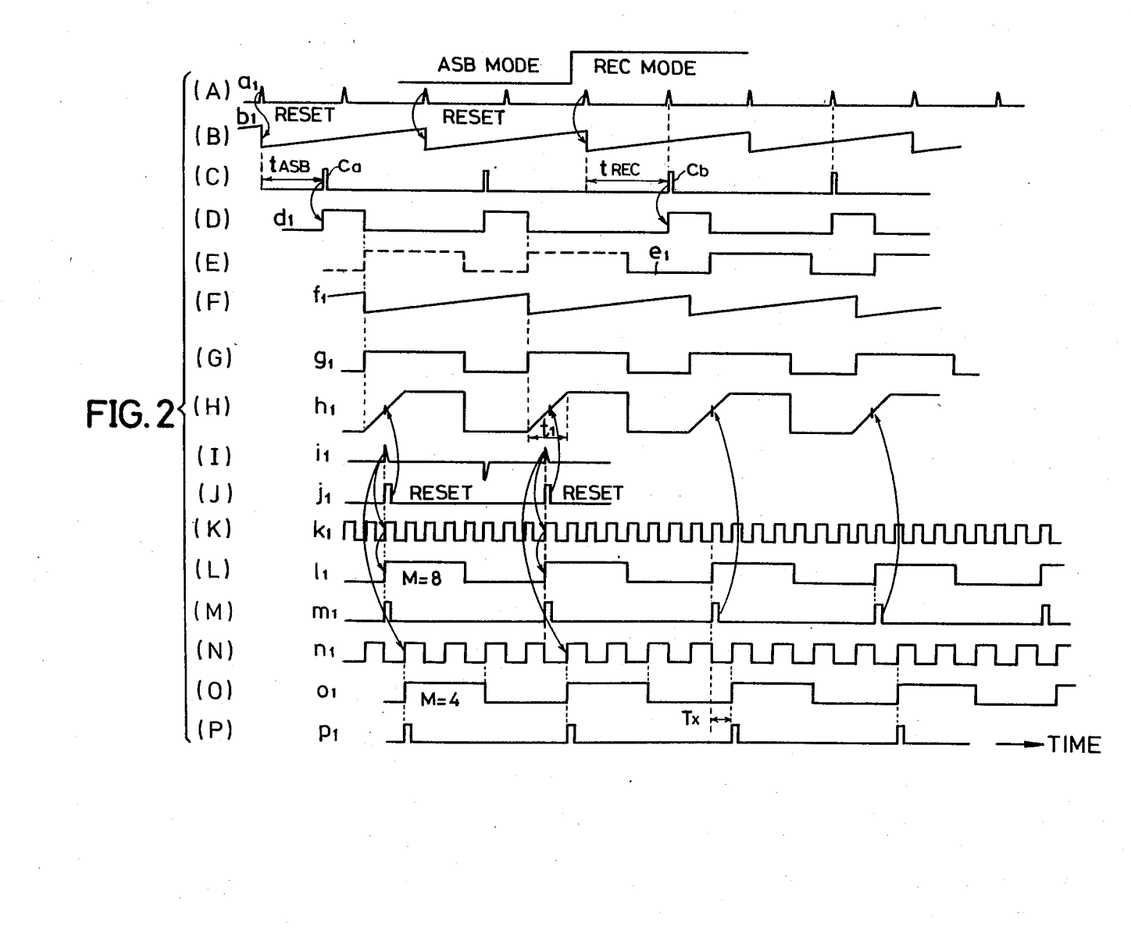
FIGS. 2(A) through 2(P) show signal waveforms at various parts of the block system shown in FIG. 1 for explaining the operation of the block system.

FIG. 1 shows a block system of an example of the conventional back-space editing control circuit. When the operation mode of the VTR is switched from a recording pause mode to a recording mode and the VTR is in an assembly state, a video signal is applied to an input terminal 11 and is supplied to a vertical synchronizing signal separating circuit 12 wherein a vertical synchronizing signal a1 shown in FIG. 2(A) is separated. The separated vertical synchronizing signal a1 is passed through a switching circuit S1 which is connected to a terminal REC/ASB in the assembly state and is supplied to a counter 13. The counter 13 counts a signal generated from a crystal oscillator 24 and supplies a reference signal b1 shown in FIG. 2(B) having a frequency of 30 Hz to a trapezoidal wave generating circuit 14. The counter 13 is reset by every other pulse of the vertical synchronizing signal a1. An output trapezoidal wave signal of the trapezoidal wave generating circuit 14 is supplied to a phase comparator 15. On the other hand, a rotation detecting head 19 detects a rotational phase of a drum motor 18 which drives a drum (not shown) on which video heads (not shown) are mounted, and an output drum rotation detection pulse signal of the head 19 is subjected to a wave shaping in a shaping circuit 20. An output signal of the shaping circuit 20 is converted into a sampling pulse signal in a sampling pulse generating circuit 21 and is supplied to the phase comparator 15. The phase comparator 15 substantially samples the phase of the output trapezoidal wave signal of the trapezoidal wave generating circuit 14 by the output sampling pulse signal of the sampling pulse generating circuit 21 and supplies a sampled signal (phase error signal) to a lowpass filter 16. An output signal of the lowpass filter 16 is supplied to a motor driving amplifier 17, and the rotational phase of the drum motor 18 is controlled by an output signal of the motor driving amplifier 17.

On the other hand, the counter 13 also generates a reference pulse signal $c_a$ shown in FIG. 2(C), and this reference pulse signal $c_a$ is supplied to a delay circuit 22 through a switching circuit S6 which is connected to a terminal ASB in the assembly state. The delay circuit 22 delays the reference pulse signal $c_a$ and generates a signal d1 shown in FIG. 2(D). The signal d1 is supplied to a counter 23 as a reset signal through a switching circuit S2 which is connected to a terminal ASB in the assembly state. A time period $t_{ASB}$ shown in FIG. 2(C) from a time when the vertical synchronizing signal is generated to a time when the reference pulse signal $c_a$ is generated, is set to $t_{REC} - t_1/2$, where $t_{REC}$ represents a time period from a time when the vertical synchronizing signal is generated to a time when a reference pulse signal $c_b$ is generated and $t_1$ represents a time period in which an output trapezoidal wave signal h1 of a trapezoidal wave generating circuit 26 shown in FIG. 2(H) has a sloping waveform. The counter 23 counts the output signal of the crystal oscillator 24, is reset by the signal d1, and generates a signal f1 shown in FIG. 2(F). The signal f1 is supplied to a monostable multivibrator 25 through a switch S3 which is connected to a terminal REC/ASB in the assembly state, and the monostable multivibrator 25 generates a signal g1 shown in FIG. 2(G). The trapezoidal wave generating circuit 26 generating the trapezoidal wave signal h1 based on the signal g1, and this signal h1 is supplied to a phase comparator 27.

A control signal is reproduced from a magnetic tape T by a control head 28 and the reproduced control signal is amplified into a signal i1 shown in FIG. 2(I) in an amplifier 29. The signal i1 is passed through a switching circuit S4 which is connected to a terminal PB/ASB in the assembly state and is supplied to a sampling pulse generating circuit 30 which generates a sampling pulse signal j1 shown in FIG. 2(J). The sampling pulse signal j1 is supplied to the phase comparator 27 to substantially sample the trapezoidal wave signal h1, and an output sampled signal (phase error signal) of the phase comparator 27 is supplied to a lowpass filter 31. An output signal of the lowpass filter 31 is supplied to a motor driving amplifier 32, and the rotational phase of a capstan motor 33 is controlled by an output signal of the motor driving amplifier 32. The capstan motor 33 rotates a capstan (not shown) which drives the tape T in a state where the tape T is pinched between the capstan and a pinch roller (not shown).

As another method of obtaining the sampling pulse signal, there is a method of using an output signal of a rotation detecting head 34 which detects the rotational phase of the capstan motor 33. In this case, the output capstan rotation detection pulse signal of the rotation detecting head 34 is amplified into a signal k1 shown in FIG. 2(K) in an amplifier 35, and the signal k1 is frequency-divided by 1/M in a 1/M frequency divider 36, where M=8, for example. The 1/M frequency divider 36 is reset by the signal i1 obtained through a switching circuit S5 which is connected to a terminal ASB in the assembly state. An output signal l1 of the 1/M frequency divider 36 shown in FIG. 2(L) is supplied to the sampling pulse generating circuit 30 through the switch S4 which is connected to a terminal REC/(ASB) in this case, and the sampling pulse generating circuit 30 supplies a sampling pulse signal m1 shown in FIG. 2(M) to the phase comparator 27.

When the assembly state is ended and a stable recording state is actually reached, the signal i1 is not obtained in either of the two methods of obtaining the sampling pulse signal. The output reference pulse signal $c_b$ of the counter 13 shown in FIG. 2(C) is passed through the switching circuit S6 which is connected to a terminal REC/PB in the recording state and is supplied to the delay circuit 22 wherein the reference pulse signal $c_b$ is formed into the signal d1. A control pulse generating circuit 37 generates a control signal e1 shown in FIG. 2(E) based on the signal d1, and supplies this control signal e1 to the control head 28 through an amplifier 38 so that the control signal is recorded on the tape T. Since the signal i1 does not exist in the capstan control system in this case, the output signal l1 of the 1/M frequency divider 36 is used to obtain a sampling pulse signal m1 shown in FIG. 2(M) in the sampling pulse generating circuit 30, and the sampling pulse signal m1 is supplied to the phase comparator 27 for sampling the trapezoidal wave signal h1.

On the other hand, in a reproducing mode (playback state) of the VTR, the switching circuits S2, S5, and S6 are respectively connected to the terminal REC/PB, and the switching circuit S3 is connected to a terminal PB. The rotational phase of the drum motor 18 is controlled based on a reference signal which is obtained by frequency-dividing the output signal of the crystal oscillator 24. The output signal of the delay circuit 22 is passed through a monostable multivibrator 39, the switching circuit S3 which is connected to the terminal PB, and the monostable multivibrator 25, and is supplied to the trapezoidal wave generating circuit 26. Hence, the rotational phase of the capstan motor 33 is controlled based on the reference signal which is obtained by frequency-dividing the output signal of the crystal oscillator 24.

The frequency of the output signal k1 of the amplifier 35 shown in FIG. 2(K) changes depending on the moving speed of the tape T, but no problems occur when the frequency of the signal k1 is relatively high. However, problems occur when the frequency of an output signal n1 of the amplifier 35 is relatively low as shown in FIG. 2(N). In other words, the signal n1 is frequency-divided by 1/M (this frequency dividing ratio 1/M is also changed depending on the change in the moving speed of the tape t, and M=4 in this case) in the 1/M frequency divider 36 which is reset by the signal i1 which is derived from the reproduced control signal. An output signal o1 of the 1/M frequency divider 36 shown in FIG. 2(O) is supplied to the sampling pulse generating circuit 30 through the switching circuit S4, and the sampling pulse generating circuit 30 generates a sampling pulse signal p1 shown in FIG. 2(P). But since the frequency of the signal n1 is low, the timing of the sampling pulse signal p1 does not coincide with the timing of an ideal sampling pulse signal such as the sampling pulse m1 (or j1), and a time difference Tx occurs between the two sampling pulse signals p1 and m1 (or j1). As a result, the phase of the sampling pulse signal p1 is deviatd from the original sampling positions of the trapezoidal wave signal h1 and the sampling pulse signal p1 may occur outside the time period $t_1$ in which the trapezoidal wave signal h1 has the sloping waveform.

Consequently, no problems occur when the trapezoidal wave signal h1 is sampled by the signal j1 (or m1) in the assembly state. However, when the trapezoidal wave signal h1 is sampled by the signal p1, the sampling cannot be performed satisfactorily, and there is a problem in that the rotational phase of the capstan motor 33 becomes disturbed when the state of the VTR changes from the assembly state to the recording state.

Accordingly, the back-space editing control circuit according to the present invention is designed to prevent the rotational phase of the capstan motor from becoming disturbed when the state of the VTR is changed from the assembly state to the recording state.

Figure 3:
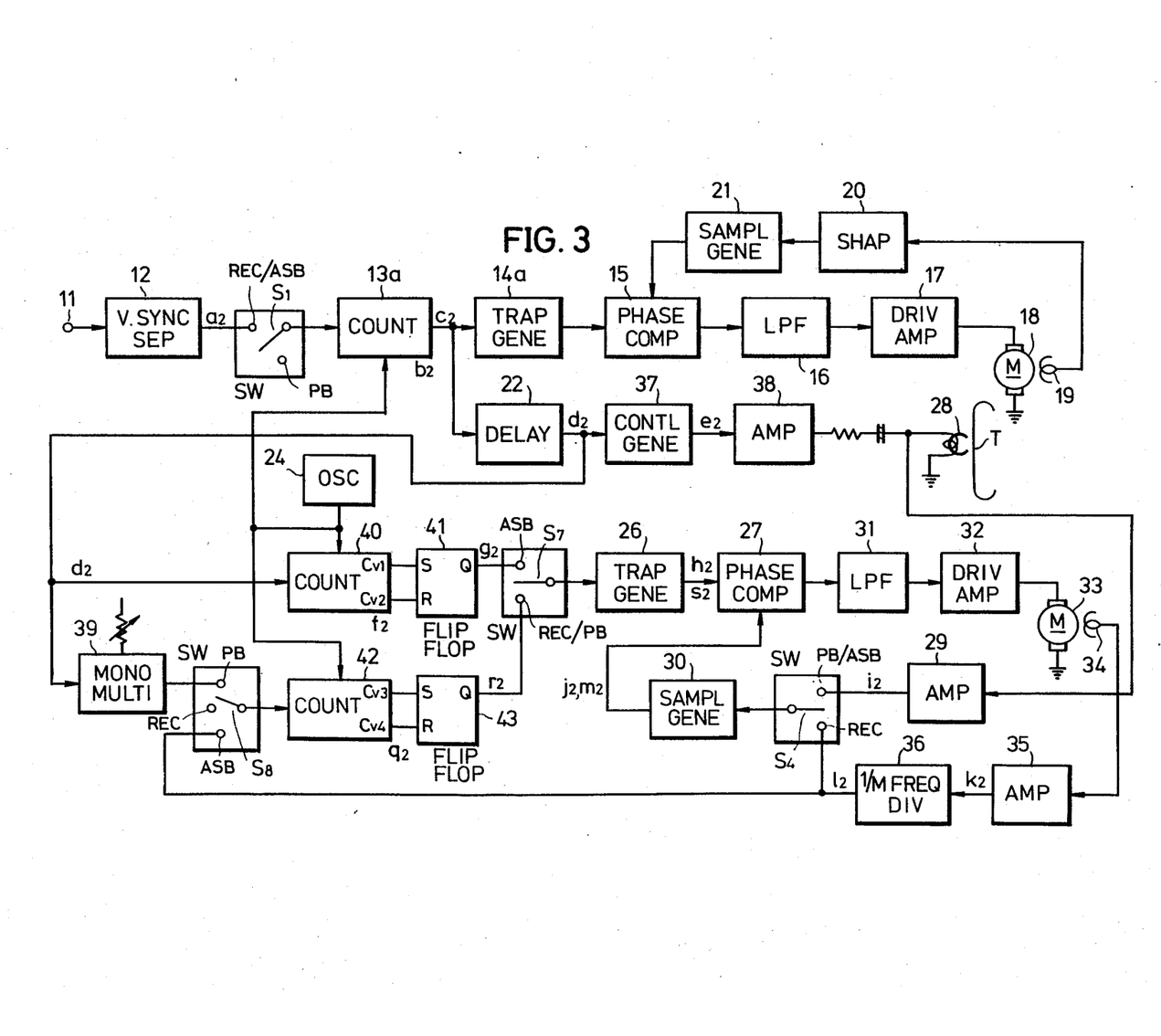
FIG. 3 is a system block diagram showing a first embodiment of the back-space editing control circuit according to the present invention.
Figure 4:
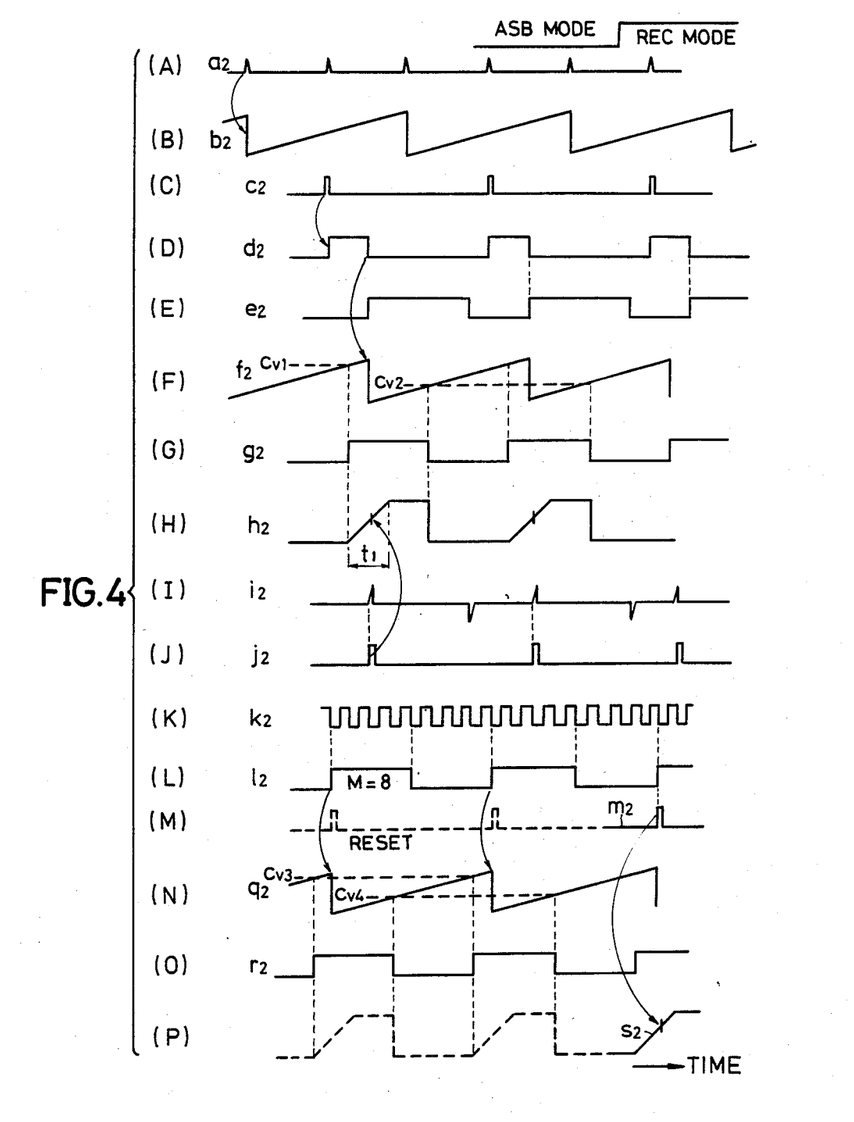
FIGS. 4(A) through 4(P) show signal waveforms at various parts of the block system shown in FIG. 3 for explaining the operation of the block system.

FIG. 3 shows a block system of the first embodiment of the back-space editing control circuit according to the present invention. In FIG. 3, those parts which are the same as those corresponding parts in FIG. 1 are designated by the same reference numerals, and description thereof will be omitted. In FIG. 3, a counter 13a counts the output signal of the crystal oscillator 24 and a counted value in the counter 13a changes as indicated by b2 in FIG. 4(B). A vertical synchronizing signal a2 shown in FIG. 4(A) is identical to the vertical synchronizing signal a1 shown in FIG. 2(A). The counter 13a generates a reference pulse signal c2 shown in FIG. 4(C) with a timing corresponding to an approximate center value of the counted value in the counter 13a. A trapezoidal wave generating circuit 14a generates a trapezoidal wave signal based on the reference pulse signal c2 and supplies the trapezoidal wave signal to the phase comparator 15.

A counter 40 is supplied with the output signal of the crystal oscillator 24 and an output signal d2 of the delay circuit 22 shown in FIG. 4(D) and having the frequency of 30 Hz as a reset signal. A counted value f2 in the counter 40 changes as shown in FIG. 4(F). The counter 40 is designed to self-reset with a timing of 30 Hz when the signal d2 is not obtained with the timing of 30 Hz. The counter 40 supplies a set signal to a set terminal S of a set-and-reset (S-R) flip-flop 41 when the counted value f2 reaches a counted value $c_{v1}$ and supplies a reset signal to a reset terminal R of the flip-flop 41 when the counted value f2 reaches a counted value $c_{v2}$. Hence, a signal g2 shown in FIG. 4(G) is obtained from an output terminal Q of the flip-flop 41.

The signal g2 rises at a time which is a time period $t_1/2$ before or a time period $2T_0 - t_1$ after a rise in an output control signal e2 of the control pulse generating circuit 37 shown in FIG. 4(E), where $T_0$ represents a field period. The signal g2 is passed through a switching circuit S7 which is connected to a terminal ASB in the assembly state and is supplied to the trapezoidal wave generating circuit 26 which supplies a signal h2 shown in FIG. 4(H) to the phase comparator 27.

On the other hand, an output signal i2 of the amplifier 29 shown in FIG. 4(I) which is derived from the reproduced control signal is supplied to the sampling pulse generating circuit 30 through the switching circuit S4 which is connected to the terminal PB/ASB in the assembly state. The sampling pulse generating circuit 30 supplies a sampling pulse signal j2 shown in FIG. 4(J) to the phase comparator 27 so as to sample the trapezoidal wave signal h2. The output sampled signal (phase error signal) of the phase comparator 27 is passed through the lowpass filter 31 and the motor driving amplifier 32 and is supplied to the capstan motor 33 so as to control the rotational phase of the capstan motor 33.

In this case, an output signal l2 of the 1/M frequency divider 36 shown in FIG. 4(L) and having the frequency of approximately 30 Hz is supplied to a counter 42 as a reset signal through a switching circuit S8 which is connected to a terminal ASB. The counter 42 is supplied with the output signal of the crystal oscillator 24, and a counted value q2 in the counter 42 changes as shown in FIG. 4(N). The counter 42 is designed to self-reset with a timing of appoximately 30 Hz when the output signal l2 of the 1/M frequency divider 36 is not obtained with the timing of approximately 30 Hz. The counter 42 supplies a set signal to a set terminal S of an S-R flip-flop 43 when the counted value q2 reaches a counted value $C_{v3}$ and supplies a reset signal to a reset terminal R of the flip-flop 43 when the counted value q2 reaches a counted value $c_{v4}$. Hence, a signal r2 shown in FIG. 4(O) is obtained from an output terminal Q of the flip-flop 43. However, this signal r2 is not used in the assembly state.

When the assembly state is ended and the recording state is reached, the signal l2 is passed through the switching circuit S4 which is connected to the terminal REC and is supplied to the sampling pulse generating circuit 30. The sampling pulse generating circuit 30 generates a sampling pulse signal m2 shown in FIG. 4(M) and supplies this sampling pulse signal m2 to the phase comparator 27. On the other hand, the counter 42 is put into a free-running state, and the output signal r2 of the flip-flop 43 shown in FIG. 4(O) is supplied to the trapezoidal wave generating circuit 26 through the switching circuit S7 which is connected to the terminal REC/PB. Hence, the trapezoidal wave generating circuit 26 generates a trapezoidal wave signal s2 shown in FIG. 4(P) and supplies this trapezoidal wave signal s2 to the phase comparator 27.

Accordingly, in the present embodiment, the trapezoidal wave signal h2 which is formed by use of the vertical synchronizing signal a2 is sampled by the sampling pulse signal j2 which is formed by use of the signal i2 (that is, the reproduced control signal) in the assembly state. On the other hand, in the recording state, the trapezoidal wave signal s2 which is formed by use of the signal k2 (that is, the capstan rotation detection pulse signal) is sampled by the sampling pulse m2 which is formed by use of the signal k2. Hence, the sampling pulse signal m2 samples the sloping part of the waveform of the trapezoidal wave signal s2 regardless of the frequency of the signal k2. Therefore, the sampling can be performed satisfactorily even when the state of the VTR changes from the assembly state to the recording state, and the rotational phase of the capstan motor 33 will not be disturbed when the state of the VTR changes from the assembly state to the recording state.

When the operation mode of the VTR is set to the reproducing mode, the output signal d2 of the delay circuit 22 is passed through the monostable multivibrator 39 and the switching circuit S8 which is connected to the terminal PB, and is supplied to the counter 42 as a reset signal. The output signal r2 of the flip-flop 43 is passed through the switching circuit S7 which is connected to the terminal REC/PB and is supplied to the trapezoidal wave generating circuit 26.

In order for the counter 40 to be reset by the signal d2 and the counter 42 to be reset by the signal l2 or the output signal of the monostable multivibrator 39, and the trapezoidal wave signal to be generated with such a timing that the rotational phase of the capstan motor 33 will not be disturbed when the state of the VTR changes from the assembly state to the recording state, it is necessary to make the timings of the reset signals coincide with the center of the sloping part of the trapezoidal wave signal. The circuit construction of the trapezoidal wave generating circuit 26 thus becomes complex when the output signals of the counters 40 and 42 are supplied directly to the trapezoidal wave generating circuit 26 so as to generate the trapezoidal wave signal with the above described timing. However, according to the present embodiment, the flip-flops 41 and 43 are respectively set and reset by the threshold values $c_{v1}$ and $c_{v2}$ of the counter 40 and the threshold values $c_{v3}$ and $c_{v4}$ of the counter 42. The flip-flop 41 is set with a timing which is the time period $t_1/2$ before the timing of the reset signal supplied to the counter 40, and the output signal g2 of the flip-flop 41 is supplied to the trapezoidal wave generating circuit 26 through the switching circuit S7. The flip-flop 43 is set with a timing which is the time period $t_1/2$ before the timing of the reset signal supplied to the counter 42, and the output signal r2 of the flip-flop 43 is supplied to the trapezoidal wave generating circuit 26 through the switching circuit S7. Therefore, according to the present embodiment, the trapezoidal wave generating circuit 26 can be constituted by a circuit having a simple circuit construction.

Other operations of the capstan control system and other operations of the drum control system are the same as those of the conventional circuit described before, and description thereof will be omitted.

Figures 5, 6:
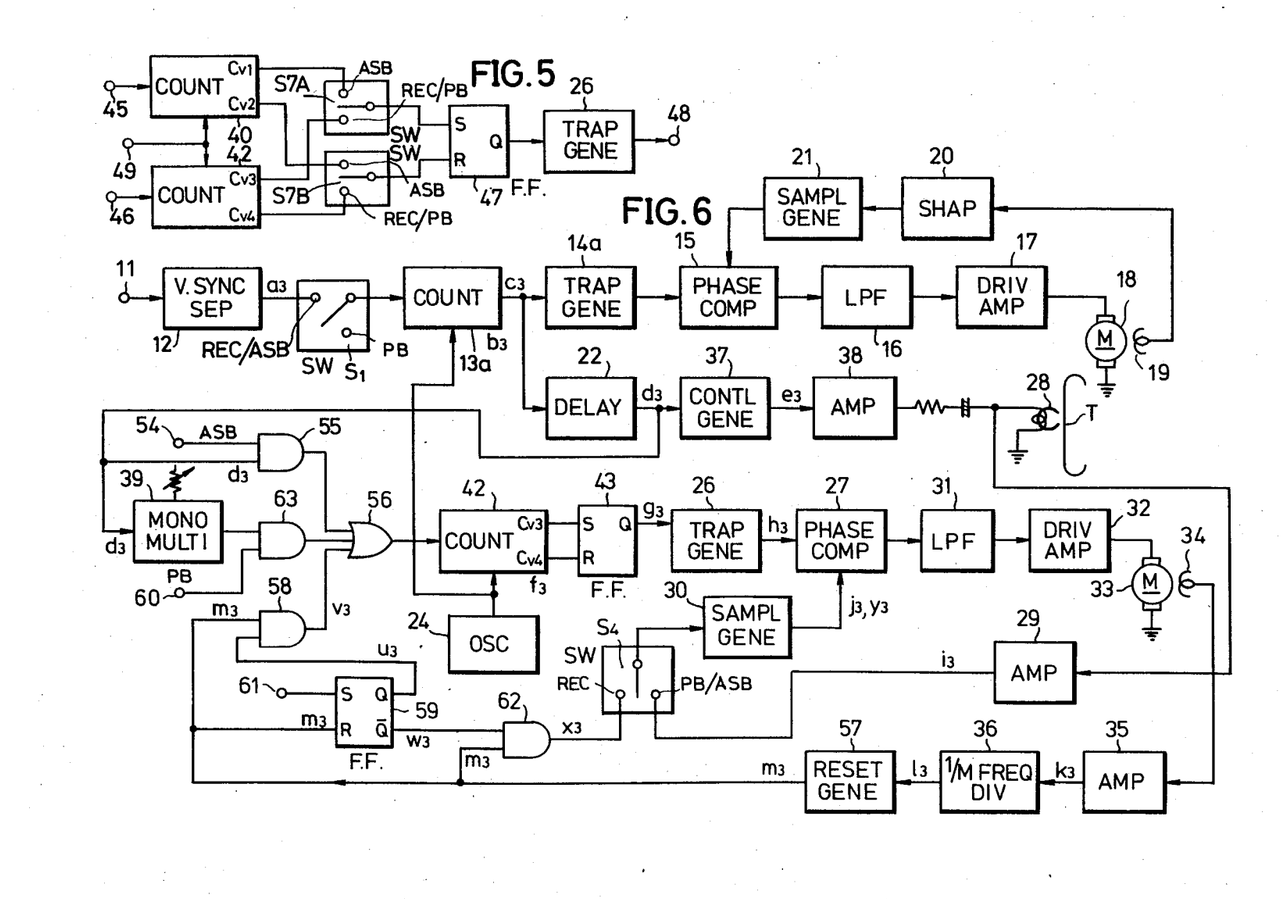
FIG. 5 is a system block diagram showing another embodiment of a part of the block system shown in FIG. 3.
FIG. 6 is a system block diagram showing a second embodiment of the back-space editing control circuit according to the present invention.

FIG. 5 shows a block system of another embodiment of a part of the block system shown in FIG. 3. In FIG. 5, those parts which are the same as those corresponding parts in FIG. 3 are designated by the same reference numerals, and description thereof will be omitted. The output signal d2 of the delay circuit 22 is applied to a terminal 45, and the output signal of the switching circuit S8 is applied to a terminal 46. The output signal of the crystal oscillator 24 is applied to a terminal 49. In the present embodiment, linked switching circuits S7A and S7B and an S-R flip-flop 47 are provided instead of the flip-flops 41 and 43 and the switching circuit S7 shown in FIG. 3. The counter 40 supplies a signal to a terminal ASB of the switching circuit S7A when a counted value thereof reaches a counted value $c_{v1}$ and supplies a signal to a terminal ASB of the switching circuit S7B when the counted value thereof reaches a counted value $c_{v2}$. Similarly, the counter 42 supplies a signal to a terminal REC/PB of the switching circuit S7A when a counted value thereof reaches a counted value $c_{v3}$ and supplies a signal to a terminal REC/PB of the switching circuit S7B when the counted value thereof reaches a counted value $c_{v4}$. An output signal of the switching circuit S7A is supplied to a set terminal S of the flip-flop 47, and an output signal of the switching circuit S7b is supplied to a reset terminal R of the flip-flop 47. A signal from an output terminal Q of the flip-flop 47 is supplied to the trapezoidal wave generating circuit 26, and the output signal of the trapezoidal wave generating circuit 26 is supplied to the phase comparator 27 shown in FIG. 3 through a terminal 48.

Figure 7:
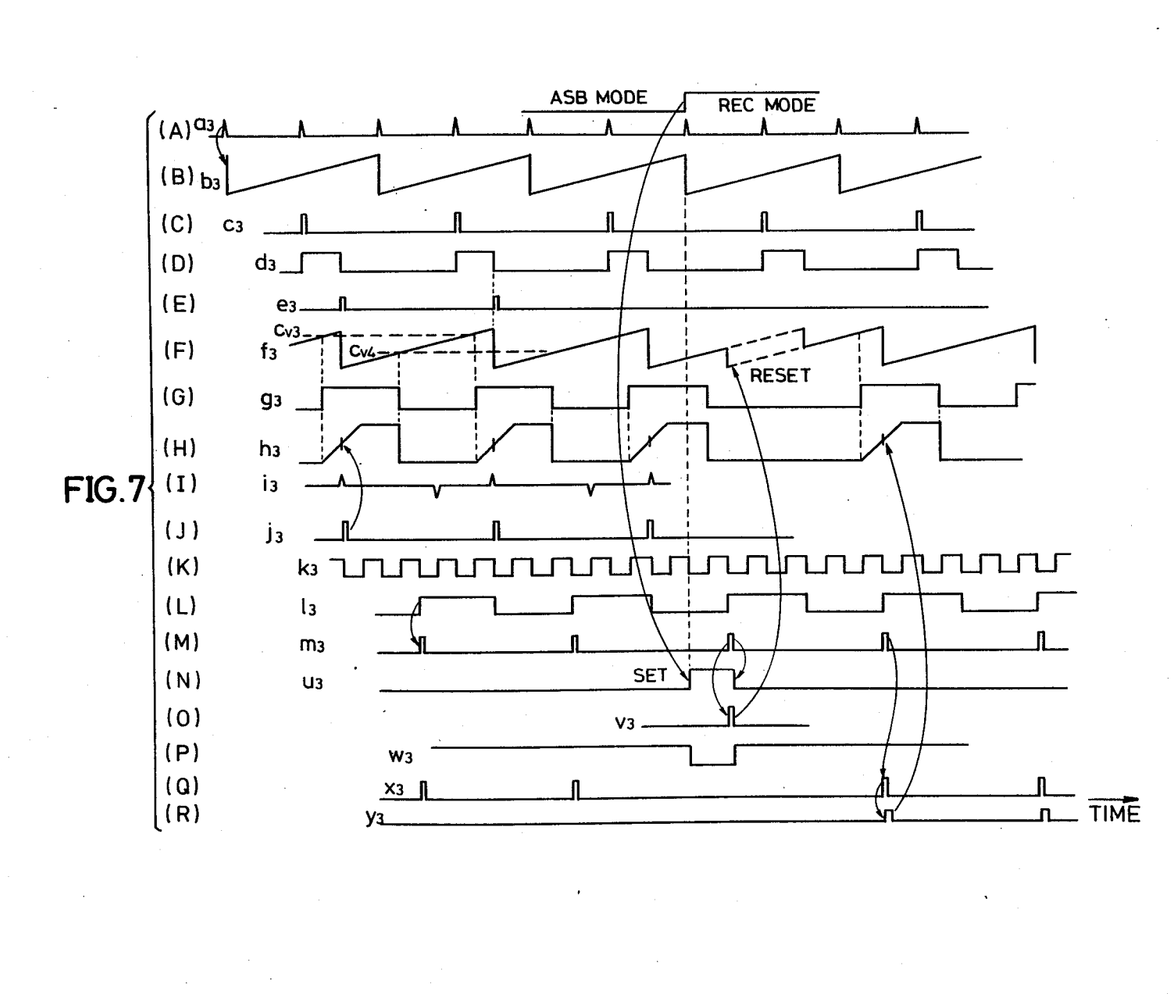
FIGS. 7(A) through 7(R) show signal waveforms at various parts of the block system shown in FIG. 6 for explaining the operation of the block system.

FIG. 6 shows a block system of the second embodiment of the back-space editing control circuit according to the present invention. In FIG. 6, those parts which are the same as those corresponding parts in FIG. 3 are designated by the same reference numerals, and description thereof will be omitted. Signals a3 through d3 shown in FIGS. 7(A) through 7(D) are substantially the same as the signals a2 through d2 shown in FIGS. 4(A) through 4(D), respectively. In the assembly state, a high-level signal is applied to a terminal 54, and a low-level signal is applied to a terminal 60. Hence, the output signal d3 of the delay circuit 22 is passed through an AND circuit 55 and an OR circuit 56 and is supplied to the counter 42 as a reset signal. Hence, a counted value f3 in the counter 42 changes as shown in FIG. 7(F) the flip-flop 43 generates a signal g3 shown in FIG. 7(G), and a trapezoidal wave signal h3 shown in FIG. 7(H) is generated from the trapezoidal wave generating circuit 26 as in the case of the first embodiment described before. An output signal i3 of the amplifier 29 shown in FIG. 7(I) is supplied to the sampling pulse generating circuit 30 through the switching circuit S4 which is connected to the terminal PB/ASB, and the sampling pulse generating circuit 30 generates a sampling pulse signal j3 shown in FIG. 7(J). An output signal k3 of the amplifier 35 shown in FIG. 7(K) is upplied to the 1/M frequency divider 36, and an output signal l3 of the 1/M frequency divider 36 shown in FIG. 7(L) is supplied to a reset pulse generating circuit 57. The reset pulse generating circuit 57 generates a reset pulse signal m3 shown in FIG. 7(M) and supplies this reset pulse signal m3 to an AND circuit 58, but a signal u3 shown in FIG. 7(N) from an output terminal Q of a flip-flop 59 has a low level and no output is obtained form the AND circuit 58.

When the state of the VTR changes from the assembly state to the recording state, a low-level signal is applied to the terminals 54 and 60, and a signal which has a high level for a predetermined time is applied to a terminal 61. As a result, the signal u3 from the output terminal Q of the flip-flop 59 assumes a high level, and a signal v3 shown in FIG. 7(O) is obtained from the AND circuit 58 in correspondence with the signal m3. The signal v3 is passed through the OR circuit 56 and is supplied to the counter 42 as a reset signal. The counted value f3 is thus obtained in the counter 42, and the trapezoidal wave signal h3 is generated from the trapezoidal wave generating circuit 26.

On the other hand, a signal w3 from an output signal $\overline{Q}$ of the flip-flop 59 shown in FIG. 7(P) assumes a high level for signal x3 shown in FIG. 7(Q) in an AND circuit 62. The signal x3 is passed through the switching cicuit S4 and is formed into a sampling pulse signal y3 shown in FIG. 7(R) in the sampling pulse generating circuit 30 so as to sample the trapezoidal wave signal h3.

According to the present embodiment, as in the case of the first embodiment described before, in the recording state, the trapezoidal wave signal h3 which is formed by use of the signal k3 (that is, the capstan rotation detection pulse signal) is sampled by the sampling pulse y3 which is formed by use of the signal k3. Hence, the sampling pulse signal y3 always samples the sloping part of the waveform of the trapezoidal wave signal h3, and the sampling can be performed satisfactorily even when the state of the VTR changes from the assembly state to the recording state. As a result, the rotational phase of the capstan motor 33 will not be disturbed when the state of the VTR changes from the assembly state to the recording state.

When the operation mode of the VTR is set to the reproducing mode, a high-level signal is applied to the terminal 60, and the output signal of the monostable multivibrator 39 is supplied to the counter 42 through an AND circuit 63 and the OR circuit 56.

Other operations of the capstan control system and other operations of the drum control system are the same as those of the conventional circuit (and the first embodiment) described before, and description thereof will be omitted.

The trapezoidal wave generating circuit 26 may be an analog circuit or a digital circuit.

In the embodiment described heretofore, the present invention is applied to the VTR for recording and reproducing video and audio signals, but it is of course possible to apply the present invention to other information recording and reproducing apparatuses which employ the back-space editing.

Further, the present invention is not limited to these embodiments, but various variations and modifications may be made without departing from the scope of the present invention.

What is claimed is:

1. A back-sapce editing control circuit for a recording and reproducing apparatus which first assumes an assembly state before actually assuming a recording state when an operation mode of the recording and reproducing apparatus is switched from a recording pause mode to a recording mode, said recording and reproducing apparatus using a control signal reproduced from a magnetic tape in said assemblys tate to control a rotational phase of a capstan motor so that information tracks formed on the magnetic tape are accurately scanned until said recording state is reached, said back-space editing control circuit comprising:

vertical synchronizing signal separating means for separating a vertical synchronizing signal from an input video signal;

control signal generating means for generating a control signal from an output signal of said vertical synchronizing signal separating means;

control head means supplied with the control signal from said control signal generating means for recording the control signal on the magnetic tape in said recording state and for reproducing the control signal from the magnetic tape in said assembly state and a reproducing mode of the recording and reproducing apparatus;

rotation detecting means for detecting a rotational phase of said capstan motor and for generating a rotation detection signal;

sampling signal producing means for producing a sampling signal, said sampling signal being produced from the control signal which is reproduced by said control head means in said assembly state and being produced from said rotation detection signal in said recording state;

trapezoidal wave signal producing means for producing a trapezoidal wave signal, said trapezoidal wave signal being produced from the output signal of said vertical synchronizing signal separating means in said assembly state and being produced from said rotation detection signal in said recording state, said trapezoidal wave signal producing means comprising oscillator means for generating a signal having a constant frequency, first and second counters for counting the output signal of said oscillator means, said first counter being reset by the output signal of the vertical synchronizing signal separating means and producing first and second output signals when a counted value reaches first and second threshold values, respectively, said second counter being reset by a signal based on said rotation detection signal in said assembly state and running free with a predetermined frequency in said recording state to produce third and fourth output signals when a counted value reaches third and fourth threshold values, respectively, a square wave signal generating circuit for generating a square wave signal which rises and falls responsive to the first and second output signals of said first counter in said assembly state and responsive to the third and fourth output signals of said second counter in said recording state, and a trapezoidal wave generating circuit for generating the trapezoidal wave signal from the output square wave signal of said square wave signal generating circuit; and driving and control means for comparing phases of the trapezoidal wave signal from said trapezoidal wave signal producing means and the sampling signal from said sampling signal producing means to produce a phase error signal and for driving and controlling the rotational phase of said capstan motor by use of said phase error signal.

2. A back-space editing control circuit as claimed in claim 1 in which said sampling signal producing means comprises a frequency dividing circuit for frequency-dividing said rotation detection signal from said rotation detecting means by 1/M, for passing the control signal which is reproduced by said control head means in said assembly state and passing an output signal of said frequency dividing circuit in said recording state, and a sampling signal generating circuit for generating the sampling signal from an output signal of said switching circuit.

3. A back-space editing control circuit as claimed in claim 1 in which said square wave signal generating circuit comprises a first flip-flop supplied with said first and second output signals of said first counter to set and reset terminals thereof, respectively, a second flip-flop supplied with said third and fourth output signals of said second counter to set and reset terminals thereof, respectively, and a switching circuit for selectively passing an output signal of said first flip-flop in said assembly state and for selectively passing an output signal of said second flip-flop in said recording state, said switching circuit supplying an output signal thereof to said trapezoidal wave generating circuit.

4. A back-space editing control circuit as claimed in claim 1 in which said square wave signal generating circuit comprises a first switching circuit for selectively passing said first output signal of said first counter in said assembly state and for selectively passing said third output signal of said second counter in said recording state, a second switching circuit for selectively passing said second output signal of said first counter in said assembly state and for selectively passing said fourth output signal of said second counter in said recording state, and a flip-flop supplied with output signals of said first and second switching circuits to set and reset terminals thereof, respectively, said flip-flop supplying an output signal thereof to said trapezoidal wave generating circuit.

5. A back-space editing control circuit as claimed in claim 1 in which said predetermined frequency is approximately equal to 30 Hz.

6. A back-space editing control circuit as claimed in claim 1 in which said driving and control means compares the phases of the trapezoidal wave signal and the sampling signal by sampling a sloping part of a waveform of the trapezoidal wave signal by the sampling signal.

7. A back-space editing control circuit for a recording and reproducing apparatus which first assumes an assembly state before actually assuming a recording state when an operation mode of the recording and reproducing apparatus is switched from a recording pause mode to a recording mode, said recording and reproducing apparatus using a control signal reproduced from a magnetic tape in said assembly state to control a rotational phase of a capstan motor so that information tracks formed on the magnetic tape are accurately scanned until said recording state is reached, said back-space editing control circuit comprising vertical synchronizing signal separating means for separating a vertical synchronizing signal from an input video signal;

control signal generating means for generating a control signal from an output signal of said vertical synchronizing signal separating means;

control head means supplied with the control signal from said control signal generating means for recording the control signal on the magnetic tape in said recording state and for reproducing the control signal from the magnetic tape in said assembly state and a reproducing mode of the recording and reproducing apparatus;

rotation detecting means for detecting a rotational phase of said capstan motor and for generating a rotation detection signal;

sampling signal producing means for producing a sampling signal, said sampling signal being produced from the control signal which is reproduced by said control head means in said assembly state and being produced from said rotation detections ignal in said recording state, said sampling signal producing means comprising reset signal generating means for generating a reset signal from said rotation detection signal from said rotation detecting means, a switching circuit for passing the control signal which is reproduced by said control head means in said assembly state and passing an output reset signal of said reset signal generating means in said recording state, and a sampling signal generating the samplings ignal from an output signal of said switching circuit;

trapezoidal wave signal producing means for producing a trapezoidal wave signal, said trapezoidal wave signal being produced from the output signal of said vertical synchronizing signal separating means in said assembly state and being produced from said rotation detection signal in said recording state, said trapezoidal wave signal producing means comprising oscillator means for generating a signal having a constant frequency, a counter for counting the output signal of said oscillator means, said counter producing first and second output signals when a counted value reaches first and second threshold values, respectively, a circuit for supplying said output signal of the vertical synchronizing signal generating means to a reset terminal of said counter in said assembly state and for supplying the reset signal from said reset signal generating means to the reset terminal of said counter in said recording state, and a circuit part for producing the trapezoidal wave signal from the output first and second signals of said counter; and driving and control means for comparing phases of the trapezoidal wave signal from said trapezoidal wave signal producing means and the sampling signal from said sampling signal producing means to produce a phase error signal and for driving and controlling the rotational phase of said capstan motor by use of said phase error signal.

8. A back-space editing control circuit as claimed in claim 7 in which said circuit part comprises a flip-flop supplied with said first and second signals to set and reset terminals thereof, and a trapezoidal wave generating circuit for generating the trapezoidal wave signal from an output square wave signal of said flip-flop.

* * * * *